United States Patent
Kim et al.

(10) Patent No.: US 11,542,396 B2
(45) Date of Patent: Jan. 3, 2023

(54) APPLICATION OF AMINE FUNCTIONALIZED ORGANO SILANE FATTY ACID COMBO SYSTEM AS CORROSION INHIBITORS IN THE CLEAR EMISSIVE PERMANENT COATINGS ON ALUMINUM/ZINC ALLOY

(71) Applicant: Chemetall U.S., Inc., New Providence, NJ (US)

(72) Inventors: Hoon Kim, New Providence, NJ (US); Ronald Ascenzo, New Providence, NJ (US); Aaron Thompson, New Providence, NJ (US); Charles J. Gruszka, New Providence, NJ (US)

(73) Assignee: CHEMETALL U.S., INC., New Providence, NJ (US)

( * ) Notice: Subject to any disclaimer, the term of this patent is extended or adjusted under 35 U.S.C. 154(b) by 254 days.

(21) Appl. No.: 16/760,507

(22) PCT Filed: Nov. 2, 2018

(86) PCT No.: PCT/US2018/059024
§ 371 (c)(1),
(2) Date: Apr. 30, 2020

(87) PCT Pub. No.: WO2019/099215
PCT Pub. Date: May 23, 2019

(65) Prior Publication Data
US 2021/0371670 A1 Dec. 2, 2021

Related U.S. Application Data

(60) Provisional application No. 62/586,445, filed on Nov. 15, 2017.

(51) Int. Cl.
| | | |
|---|---|---|
| *C09D 5/33* | (2006.01) | |
| *C09D 7/65* | (2018.01) | |
| *C09D 7/61* | (2018.01) | |
| *C09D 7/40* | (2018.01) | |
| *C09D 123/08* | (2006.01) | |
| *C09D 133/02* | (2006.01) | |
| *C09K 5/14* | (2006.01) | |
| *B05D 7/16* | (2006.01) | |

(52) U.S. Cl.
CPC ............... *C09D 5/004* (2013.01); *C09D 7/61* (2018.01); *C09D 7/65* (2018.01); *C09D 7/70* (2018.01); *C09D 123/0846* (2013.01); *C09D 133/02* (2013.01); *C09K 5/14* (2013.01); *B05D 7/16* (2013.01)

(58) Field of Classification Search
CPC . C09D 5/004; C09D 7/65; C09D 7/61; C09D 7/70; C09D 123/0846; C09D 133/02; C09K 5/14; B05D 7/16
See application file for complete search history.

(56) References Cited

U.S. PATENT DOCUMENTS

2012/0107625 A1* 5/2012 Smith ..................... C09D 7/70
427/256

FOREIGN PATENT DOCUMENTS

| WO | 2012059375 A1 | 5/2012 |
| WO | 2017070140 A1 | 4/2017 |

OTHER PUBLICATIONS

International Search Report and Written Opinion for International Application No. PCT/US2018/059024, dated Jan. 23, 2019, 7 pages.

* cited by examiner

*Primary Examiner* — Nicole M. Buie-Hatcher
*Assistant Examiner* — Jiangtian Xu
(74) *Attorney, Agent, or Firm* — Armstrong Teasdale LLP

(57) ABSTRACT

Disclosed is a composition for applying a clear or translucent emissive coating on an aluminum containing surface. The composition includes, in a dispersion, 50 to 300 g/l of at least one of clear or translucent organic polymeric substances of a binder, and 30 to 300 g/l of sheet silicate pigments having a TE value for the thermal emissivity of at least 0.40, having a particle size distribution of which $d_{50}$ is in the range of 0.3 to 80 μm and having been comminuted, disintegrated, exfoliated or any combination of these to thin particles. The composition additionally includes the reaction product of at least one aminefunctionalized organosilane and/or oligomer and/or polymer thereof and at least one fatty acid. The molar ratio of the amino group/s of the at least one amine-functionalized organosilane and/or oligomer and/or polymer thereof and of the at least one fatty acid is 1.2:1 to 1:2.

22 Claims, No Drawings

APPLICATION OF AMINE FUNCTIONALIZED ORGANO SILANE FATTY ACID COMBO SYSTEM AS CORROSION INHIBITORS IN THE CLEAR EMISSIVE PERMANENT COATINGS ON ALUMINUM/ZINC ALLOY

CROSS-REFERENCE TO RELATED APPLICATIONS

This application is a U.S. National Phase Application of PCT/US2018/059024, filed Nov. 2, 2018, which claims the benefit of priority to U.S. Provisional Application No. 62/586,445, filed Nov. 15, 2017, the contents of which are hereby expressly incorporated by reference in their entirety.

FIELD OF THE INVENTION

This present invention relates to a composition for applying a clear or translucent emissive coating on an aluminum containing surface as well as to a corresponding process for applying an emissive coating, to an emissive coating which may be prepared by said process and finally to a cool element comprising such a coating.

BACKGROUND OF THE INVENTION

Energy saving and environmental protection are an important topic in many countries. Within such targets, cool roofing of buildings is one of the fields. In the United States of America, a variety of standards has been developed to control and to measure energy losses as well as energy savings.

Emissive coatings show a reduced absorption of electromagnetic radiation. They are seeked to reduce the amount of heat transfer from solar irradiance by absorption to transmission and to increase the amount of heat to be reflected.

A cool roof has a cool element that reflects the heat of the sun light and emits absorbed radiation back into the atmosphere in a higher degree than conventional. The cool element allows that the cool element and the thermally protected object like the cool roof stays cooler and reduces the amount of heat transferred to the thermally protected object like a building or an inner space of a transportation unit keeping the thermally protected object cooler and at a more constant temperature. It is estimated that if there would be used nationwide cool roofs over U.S.A., there would occur annual savings of about 1 billion US-$.

For gaining a cool roof and similar cool elements, the following effects have to be considered: Solar reflectance, thermal emissivity of energy which is initially absorbed and not reflected and then radiated, thermal resistance to resist the flow of heat into the interior, thermal mass e.g. to absorb solar energy during the day and emit it in the night, some heat to be absorbed and transferred into the interior, water transpiration especially of porous or vegetated roof surfaces, convection because of wind as well as the slope of the roof. Further on, especially the construction type, the occupancy type and the product density influence the thermal conditions.

Such conditions can be transferred to similar applications like for cool elements or for inflammable elements or both like e.g. elements of aeroplanes, of automobiles, of bicycles, of flying objects, of ships, of trains, of rockets, of satellites, of exterior antennae, of exterior architectural elements, of guard-rail elements, of tanks, of chemical plant elements, of textile elements, of papers or wall-papers, of plastics' materials containing elements, of wood-containing elements, of other coated elements, of painted and emissively coated elements, of coated elements made of glass, metallic materials, organic materials etc.

The reduction of heat of buildings and further thermally protected objects like transportation units may contribute to reduce urban temperatures and air pollution e.g. by smog. Therefore, cool elements may contribute in several aspects to enhance the quality of life.

However, many producers of metallic elements for architectural use would like to produce colorless or only slightly colored translucent or even better clear coatings so that the structure of the metallic surface is well visible like zinc flowers of the metallic surface even with the naked eye.

Despite all efforts for cool roofing elements and for similar cool elements, there has been a lack of clear or translucent emissive coatings e.g. on metallic elements like metallic sheets for example made from Galvalume®, Galfan®, Galvanneal® or any type of zinc or zinc containing alloy or aluminum alloy coated steel. And there has been a lack of clear or translucent emissive coatings to be used in different applications, e.g. on glass, wood, painted substrates etc.

This problem has been solved in US 2012-0107625 A1. Here, according surfaces are treated with a dispersion comprising a clear or translucent organic polymeric substance of a binder and a sheet silicate pigment having a certain particle size distribution and having been comminuted, disintegrated or exfoliated to thin particles. That way, a clear or translucent and colorless or nearly colorless emissive coating especially for cool roofing may be obtained.

However, in case of treating metal surfaces, once a metal surface is stained or corroded, the entire coating system might no longer properly function as a low energy system because the reflectance of the metal surface would be lowered. Similarly, if the coating components (mainly polymers) are degraded with discoloration, the coating would not be considered as clear emissive coating anymore by losing the original clarity.

Thus, especially in the U.S.A. as well as in Canada, metallic sheets for architectural use are often seeked to fulfill the following high requirements in terms of anti-corrosion and anti-UV degradation:

Neutral Salt Spray (NSS) Test in accordance with ASTM B 117 over 1000 hours: <5% black/white rust, no stains/water marks QUVa test (accelerated weathering test under UV light condition, developed by Q-lab) in accordance with ASTM D4587 over 2000 hours: $\Delta E<3\%$, gloss retention>60%

Even for the emissive coatings of US 2012-0107625 A1, these requirements are hard to meet on aluminum containing surfaces, in particular on surfaces comprising an aluminum-zinc alloy such as Galvalume®.

As will be explained hereinafter, the present invention deals with a composition for applying a clear or translucent emissive coating—especially for cool roofing—on an aluminum containing surface—especially on a surface comprising an aluminum-zinc alloy—with improved anti-corrosion and anti-UV degradation properties, which meets the above mentioned high requirements.

BRIEF DESCRIPTION OF THE INVENTION

According to the present invention, the composition for applying a clear or translucent emissive coating on an aluminum containing surface comprises, in a dispersion a) 50 to 300 g/l of at least one of clear or translucent organic polymeric substances a) of a binder, and
b) 30 to 300 g/l of sheet silicate pigments b) having a TE value for the thermal emissivity of at least 0.40, having a particle size distribution of which $d_{50}$ is in the range of 0.3 to 80 μm and having been comminuted, disintegrated, exfoliated or any combination of these to thin particles, and additionally comprises c) the reaction product of at least one amine-functionalized organosilane and/or oligomer and/or polymer thereof and at least one fatty acid, wherein the molar ratio of the amino group/s of the at least one amine-functionalized organosilane and/or oligomer and/or polymer thereof and of the at least one fatty acid is 1.2:1 to 1:2, and wherein the at least one amine-functionalized organosilane and/or oligomer and/or polymer thereof is linked to the at least one fatty acid by at least one carboxylic acid/amine salt bond and/or by at least one amide bond.

The above component c) per se forms a clear film on the aluminum containing surface and, thus, does not affect the clarity of the produced emissive coating. Furthermore, c) is assumed to participate in the curing process of the emissive coating resulting in enhanced coating strength. The nonpolar hydrocarbon chains of the fatty acid parts function as barrier to prevent corrosive chemicals from accessing the metal surface.

DETAILED DESCRIPTION OF THE PREFERRED EMBODIMENTS

Regarding the present invention, the term "composition" is directed to liquid compositions especially of so-called concentrates, high solids' baths, low solids' baths and replenishment products. Accordingly, the ranges mentioned above are broad to cover all these contents. The term "coating" is typically directed to the dried or dried and cured coating.

An "aluminum containing surface" in the sense of the present invention comprises aluminum and/or at least one aluminum alloy and may be coated with at least one conversion and/or passivation layer. The aluminum-containing surface may additionally comprise surface areas consisting of other materials than aluminum or aluminum alloys.

In the following the term "amine-functionalized organosilane" stands for an amine-functionalized organosilane and/or oligomer and/or polymer thereof, which may originate from the (partial) hydrolysis of the amine-functionalized organosilane and the subsequent (partial) condensation of the hydrolysis product, i.e. the corresponding organosilanol.

The following paragraphs describe preferred embodiments of the composition according to the present invention.

Preferably, the aluminum containing surface comprises of at least one aluminum alloy. At that, aluminum alloys containing as other metals Cu, Si, Mg and/or Zn are preferred like the cast aluminum alloys Al319 and Al356-T6 or the wrought aluminum alloys Al6061-T6 and Al7075. More preferred aluminum alloys are aluminum-zinc alloys, especially preferably Galvalume® (55 wt.-% Al and 45 wt.-% Zn).

The binder a) may be of any organic polymeric material or of any organic material that is easily rendered to be polymeric or both. The binder and the thereof generated binder matrix of the coating are preferably clear or translucent and colorless or nearly colorless. The organic substances of the binder may be selected from very many well known substances. They are preferably selected from the group consisting of 1.) acrylics like acrylic casting systems, methacrylic systems, self-crosslinking acrylics, crosslinked acrylics, anionic acrylic resin, modified anionic acrylic resin, acryl-modified fluoro polymers, styrene-acrylics like water resistant styrene-acrylics, as well as acrylic-urethanes, 2.) alkyds like silicone modified alkyd resins, 3.) carbonates like polycarbonates, 4.) epoxies like epoxy esters and two component epoxy systems, 5.) fluoropolymers, 6.) ionomers like ethylene acrylates and ethylene methacrylates and like 7.) methylene acrylates, methylene methacrylates, acrylate hydrates and methacrylate hydrates, 8.) phenols, 9.) polyesters like polyester resins, polyester casting systems and polyol two component systems, 10.) polyethers, 11.) polyolefins, 12.) styrenes, 13.) urethanes like urethane-prepolymers, cationic urethane, urethane with a content of a polycarbonate and other urethane copolymers, 14.) vinyls like vinyl esters, 15.) styrene acrylates and 16.) their prepolymers, their derivatives, their modifications, their comonomers, cooligomers and their copolymers including blockcopolymers. More preferred, the composition contains at least one ionomeric compound, at least one acrylic substance, at least one methacrylic substance, at least one urethane substance, any derivative of any of these, any modification of any of these or any combination thereof.

Especially preferred are mixtures or copolymers or both selected from the group consisting of acrylics, carbonates, ionomers, polyesters, polyethers, styrenes and urethanes. The binder forms with the further constituents except of the sheet silicate pigments b), except of optional other particles and except of substances not integrating in the binder matrix or not reacting with the binder like some of the additives. The binder matrix is formed with all other constituents of the composition, especially with amines, others of the additives, crosslinking agents, photoinitiators, silanes or any combination of these. The binder or the binder matrix may be dried and optionally cured—in many embodiments by at least one chemical reaction. The substances added to form the binder may be added as a powder, as a dispersion, as an emulsion, as a solution or in any combination thereof to the composition or may be added to a pre-mixture that will be later added to give the composition or both.

Preferably, the binder or the binder matrix or both are clear or translucent and are colorless or have only a slight color. Preferably, the binder matrix or the dried and optionally cured binder matrix or both are clear or translucent and are colorless or have only a slight color.

Preferably, the sheet silicate pigments b) are comminuted, disintegrated or exfoliated to thin plate-like particles especially by calcining, milling, exfoliating in a dry status or in a suspension like in water or in a polar solvent or any combination of these. The comminution, disintegration, exfoliation or any combination of these of the sheet silicates used may be or may have been performed by any mechanical or thermal method or both. Preferably, the sheet silicate pigments are or have been thoroughly de-layered or thoroughly splitted or both. More preferred, they are or have been triturated or de-layered or splitted or disintegrated or exfoliated e.g. by calcining or by milling or by any other dressing method or by any similar method or comminuted, disintegrated, exfoliated or by any combination thereof. Preferably, they are strongly comminuted or strongly disintegrated or both.

The sheet silicate pigments have been measured with a Brookhaven Instrument 90Plus Particle Size Analyzer using 90Plus Particle Sizing Software Vers. 3.74. The upper limit of the average particle size d50 of the sheet silicate pigments is primarily determined by the thickness of the coating to be generated. Therefore, if the coating would have a thickness e.g. of about 100 μm thickness, an average particle size d50 of the sheet silicate pigments of less than 80 μm is preferred. More preferred, the average particle size of the sheet silicate pigments d50 is in the range of from 0.4 μm to 60 μm or in the range of from 0.45 to 40 μm or in the range of from 0.5 to 30 μm, even more preferred in the range of from 0.6 to 20 μm or of from 0.8 to 12 μm or of from 1 to 8 μm or of from 1 to 4 μm. Preferably, the sheet silicate pigments have an average particle thickness of less than 10 μm thickness perpendicular to the sheet level, more preferred a particle thickness of less than 8 μm, 6 μm, 4 μm, 3 μm, 2 μm, 1.5 μm or less than 1.0 μm or less than 0.8 μm or less than 0.6 μm or less than 0.4 μm or less than 0.2 μm thickness. Often, the average particle size of the sheet silicate pigments or the average particle thickness perpendicular to the sheet level of the sheet silicate pigments or both depend on the thickness of the coating to be generated and its application. In many embodiments, the sheet silicate pigments do not have any significant coloring tone or even any well visible coloring tone that is clearly seen with the naked eye or that influences the color of the dried or dried and cured binder matrix significantly. Preferably, the sheet silicate pigments are strongly disintegrated or exfoliated or both from bigger well crystallized crystals like big mica crystals. Or they may have been disintegrated or exfoliated or both from any clay or clay-like product like any hydromicas or sericite. In few embodiments, the sheet silicate pigments are fluorescent or are covered with a fluorescent coating, so that they may be well seen e.g. under UV light.

Preferably, the sheet silicate pigments are selected from sheet silicates like micas or clays or both. They may be preferably selected from sheet silicates like pyrophillite, talc, muscovite, phlogopite, lepidolithe, zinnwaldite, margarite, hydromuscovite, hydrophlogopite, sericite, montmorillonite, nontronite, hectorite, saponite, vermiculite, sudoite, pennine, klinochlor, kaolinite, dickite, nakrite, antigorite, halloysite, allophone, palygorskite, synthetic clays like such called Laponite® and such on the base of hectorite, thereto related clays as well as talc. More preferred, they are selected from sheet silicates selected from the group consisting of pyrophillite, muscovite, phlogopite, lepidolithe, zinnwaldite, hydromuscovite, hydrophlogopite, sericite, montmorillonite, vermiculite, kaolinite, dickite, nakrite, antigorite and halloysite. Most preferred, the sheet silicate pigments are selected from the group consisting of pigments based on muscovite, phlogopite, pyrophyllite and zinnwaldite, especially based on muscovite.

The mean particle size of clays like such called Laponite® may preferably be in the range of from 5 to 800 nm, especially in the range of from 10 to 250 nm, 12 to 100 nm, 15 to 60 nm or 20 to 30 nm. The clay particles show preferably an average aspect ratio in the range of from 10 to 8000, of from 50 to 2000 or of from 200 to 800, especially an average aspect ratio of 500±250. It is especially preferred that the clays to be added to the composition are able to hydrate to form gels or sols, which may increase the efficiency of at least one of the thermal properties. When the gel or sol dries, the hydrated particles coalesce to form a film increasing the overall particle size dramatically. Transparent clays are preferred.

The clays and related substances are preferably selected from such on the base of serpentinite/antigorite/chrysotile, on the base of talc/steatite, on the base of hectorite, on the base of stevensite, on the base of talc and/or chlorite, on the base of hydroantigorite or any combination or mixture of these. They may show an optional content of fluorine, further cations and/or sodium pyrophosphate.

The pigments may preferably be added to the composition or to a premixture that will be later added to the composition as a powder or as a dispersion, but their addition as a dispersion is more preferred.

Preferably, there are not added any other particles to the composition. Preferably, there are no other particles, e.g. of pigments, included in the generated coatings of the invention.

Nevertheless, there may be seldom used embodiments, in which an addition of any other particles like coloring pigments, pigments to generate cloudy, dim or dull coatings, infrared=IR reflective pigments not being sheet silicates, thermally conductive pigments, electrically conductive pigments or any combination thereof. The amount of such pigments may then be preferably in the range of from 0.1 to 12 g/l, of from 1 to 8 g/l or of from 3 to 6 g/l. In the generated coating, this pigment content may be in the range of from 0.1 to 12% by weight, of from 1 to 9% by weight or of from 3 to 6% by weight. Then, the liquid composition or the generated coating or both are often not clear or are often not translucent and are often not colorless or are even significantly colored including grey, dark and black colors. Then, of course, it is not possible to generate a clear or translucent and colorless or nearly colorless emissive coating with such modified compositions. Therefore, there is no need to add any organic polymeric substances a) that are clear or translucent and colorless or nearly colorless, but this requirement may be altered then to "milky or translucent or white and in any way colored or white or dark" for the organic polymeric substances a), for any particles resp. pigments added, for the compositions and for the coatings generated thereof.

As for the reaction product c) of at least one amine-functionalized organosilane and/or oligomer and/or polymer thereof and at least one fatty acid, the at least one amine-functionalized organosilane may be a single organosilane or a mixture of two or more different organosilanes.

The at least one amine-functionalized organosilane has at least one hydrocarbyl moiety, which carries at least one amino group. As amino group/s primary —NH2 is preferred. The organosilane preferably has one hydrocarbyl moiety carrying one amino group. However, it may also have two or more hydrocarbyl moieties carrying one or two or more amino groups.

As hydrocarbyl moiety/ies alkyl is preferred, more preferably alkyl having three or more carbon atoms. According to one embodiment, at least one amine-functionalized organosilane having two or more alkyl groups and/or branched alkyl groups may be used being more stable in terms of hydrolysis. However, the adhesion of such organonosilanes to the treated aluminum containing surface could be lower.

Beside the at least one hydrocarbyl moiety, the at least one amine-functionalized organosilane preferably has one or more hydrocarbyloxy moiety, wherein the sum of the hydrocarbyl and the hydrocarbyloxy moieties is preferably four, i.e. there is/are no other moiety/ies at the central silicon atom of the organosilane. As hydrocarbyloxy moiety/ies alkyloxy is preferred.

However, the at least one amine-functionalized organosilane may also have one or more —OH groups instead of the one or more hydrocarbyloxy group.

Especially preferably the at least one amine-functionalized organosilane is an aminoalkyl trialkoxysilane and most preferably 3-aminopropyl triethoxysilane.

Preferably the composition comprises at least one oligomer and/or polymer of an amine-functionalized organosilane. The use of such oligomers and/or polymers leads to enhanced stability of the composition.

The at least one fatty acid may be a single fatty acid or a mixture of two or more different fatty acids.

The at least one fatty acid preferably has at least 8, more preferably at least 12, more preferably at least 16 and especially preferably at least 20 carbon atoms. Long chain fatty acids result in increased lubricity of the composition and are therefore preferred.

Moreover, the hydrophobic nature of long hydrocarbon tails suppresses undesirable gel formation within the composition by preventing excess hydrolysis and subsequent condensation. Non-polar hydrocarbon chains repel water and, thus, reduce the chance of water contact to the amine-functionalized organosilane.

According to an embodiment, the at least one fatty acid has a branched hydrocarbon tail, preferably with at least one side chain having at least 2 carbon atoms and more preferably with at least on side chain having at least 4 carbon atoms. Such branched hydrocarbon tails are advantageous, if the aluminum containing surface is treated with an amine-functionalized organosilane and/or oligomer and/or polymer thereof having a large polar head group, e.g. 3-triethoxysilyl-propylamino-.

The adhesion of the at least one fatty acid to the aluminum containing surface may be enhanced by introducing at least one C=C double bond into the at least one fatty acid, as there is an attraction between C=C double bonds and aluminum.

Hence, the at least one fatty acid preferably has a hydrocarbon tail exhibiting at least one C=C double bond, more preferably at least one C=C double bond in cis configuration, as the latter is expected to especially enhance the adsorption to the aluminum containing surface. Most preferably the at least one fatty acid is erucic acid.

The properties of the composition according to the invention as well as of the resulting clear or translucent emissive coating may be tailored by using a mixture of at least two fatty acids with different hydrocarbon tails (number of carbon atoms, hydrophobicity/hydrophilicity, unbranched/branched, saturated/unsaturated) as the at least one fatty acid.

The thickness and density as well as the adsorption of the anti-corrosion film on the treated aluminum containing surface depend on the length and structure of the hydrocarbon tail(s) of the applied at least one fatty acid as well as on the structure of the used at least one amine-functionalized organosilane. Branched tails lead to films being less dense and less thick but exhibiting strong adsorption, whereas long, linear tails result in films having higher density and thickness at the cost of some adsorption strength. A large head group originating from the organosilane results in films having lower density and thickness but with strong adsorption, whereas a small head group leads to films being denser and thicker accompanied with some loss in adsorption strength.

In a preferred embodiment approx. at least 5 mol-%, preferably approx. at least 10 mol-% and more preferably approx. at least 15 mol-% (detected by FT-IR spectroscopy through the peak intensity ratio of the amide bond at 1640 cm-1 and the carboxylic acid/amine salt bond at 1560 cm-1) of the linkages between the at least one amine-functionalized organosilane and/or oligomer and/or polymer thereof and the at least one fatty acid are amide bonds. Due to their covalent nature, amide bonds are more resistant to hydrolysis than the according salt form.

In the composition the molar ratio of the amino group/s of the at least one amine-functionalized organosilane and/or oligomer and/or polymer thereof and of the at least one fatty acid is preferably 1.1:1 to 1:1.5 and more preferably 1.0:1 to 1:1.2.

The reaction product c) of at least one amine-functionalized organosilane and/or oligomer and/or polymer thereof and at least one fatty acid process may be prepared by the following process:
  i) the at least one amine-functionalized organosilane (referring to the amino group/s) and at least one fatty acid are mixed in a molar ratio of 1.2:1 to 1:2 in a neat reaction or in an essentially water-free medium, and
  ii) under stirring the mixture is subjected for at least 15 minutes to a temperature of at least room temperature, so that at least 5 mol-% (detected by FT-IR spectroscopy) of the linkages between the at least one amine-functionalized organosilane and the at least one fatty acid are amide bonds.

By conducting step ii), the alkoxygroups of the remaining at least one organosilane and/or the respective organosilane moiety are at least partially hydrolyzed by the water produced in the formation of the amide bonds and the silanol groups resulting from this hydrolysis are then at least partially condensed.

Step ii) is based on a typical exothermic acid/base reaction. The ratio of ionic to amide linkage as well as the amount of oligomeric and polymeric amino-functionalized organosilane species in the composition depends on the degree of exothermicity.

According to one embodiment, step ii) is conducted at room temperature. In the course of that, the reaction time in step ii) is preferably more than 30 minutes and especially preferably more than 40 minutes. This way, no detectable oligomeric/polymeric species are obtained in the reaction product and, hence, the latter exhibits a low grade of viscosity.

The higher the reaction temperature, the higher is the grade of amidation. Hence, according to another embodiment, step ii) is performed at a temperature above room temperature, preferably above 40° C. and especially preferably above 60° C. Increasing temperature leads to an increasing amount of oligomeric/polymeric species as well and, thus, to a reaction product with a higher grade of viscosity.

Both, enhanced amidation and hydrolysis occur at temperatures of more than approx. 70° C. Amide linkage is favorable but excess hydrolysis is detrimental. Hence, it is advantageous not to apply a reaction temperature of more than approx. 90° C., in order to prevent too much hydrolysis.

Therefore, according to an especially preferred embodiment, step ii) is conducted at a temperature of between approx. 70° C. and approx. 90° C. In the course of this, the reaction time in step ii) is preferably more than 4 hours, more preferably more than 6 hours and especially preferably approx. 8 hours.

Accordingly, it is important to maintain the exotherm constant for every batch in order to produce consistent products. To overcome viscosity increase during the reaction, a powerful stirrer device is advisable.

According to most of the preferred embodiments of the invention, the composition and the thereof generated coating are preferably at least free of chromium Cr6+ and are more preferred produced without intentive addition of any chromium compound, which often and preferably means that they are chrome-free. Nevertheless, there may occur seldom situations, in which chromium may be leached out of chromium containing alloys so that traces may be included in the bath of the composition of the present invention or in which traces of chromium are dragged in from other baths into the bath of the composition of the present invention. Then such chromium content can be contained in the generated emissive coating too. Nevertheless, in some of the preferred embodiments of the invention, the composition may preferably contain at least one intentively added chromium compound to further enhance the corrosion resistance of the generated coatings, especially of chromium(III), preferably in an amount in the range of from 0.01 to 3 g/l, of from 0.2 to 2 g/l or of from 0.6 to 1.5 g/l Cr2O3.

Preferably, in many embodiments of the invention, the composition as well as the thereof generated emissive coatings do not contain a significant amount e.g. of up to 0.1 or up to 0.01 g/l in the composition resp. e.g. of up to 0.1 or up to 0.01% by weight in the coating or do not contain any intentively added amount of heavy metals selected from the group consisting of Co, Cr, Cu, Mo, Ni, V, W and Zn.

The content of organic polymeric substances a) in the composition is in the range of from 50 to 300 g/l, preferably in the range of from 100 to 280 g/l, of from 120 to 260 g/l, of from 150 to 240 g/l or of from 180 to 220 g/l.

The content of sheet silicate pigments b) in the composition is in the range of from 30 to 300 g/l, preferably in the range of from 50 to 220 g/l, of from 55 to 180 g/l, of from 60 to 150 g/l, of from 60 to 100 g/l or of from 65 to 85 g/l.

Regarding the content of the reaction product c) in the composition, the at least one amine-functionalized organosilane and/or oligomer and/or polymer thereof is preferably comprised in a concentration of 0.5 to 40 g/l, more preferably 1 to 20 g/l and most preferably 3 to 10 g/l, and the at least one fatty acid is preferably comprised in a concentration of 0.5 to 40 g/l, more preferably 1.5 to 30 g/l and most preferably 5 to 14 g/l.

The weight ratio of organic polymeric substances a) to sheet silicate pigments b) in the composition as well as in the thereof generated coating is preferably in the range of from 1.0:1 to 8:1, more preferably from 1.5:1 to 6:1, more preferably from 2.0:1 to 4.0:1 and most preferably from 2.5:1 to 3.0:1.

The weight ratio of organic polymeric substances a) to the reaction product c) of at least one amine-functionalized organosilane and/or oligomer and/or polymer thereof and at least one fatty acid in the composition as well as in the thereof generated coating is preferably in the range of from 3:1 to 15:1, more preferably from 4:1 to 14:1, more preferably from 6:1 to 13:1 and most preferably from 8:1 to 12:1.

The weight ratio of sheet silicate pigments b) to the reaction product c) of at least one amine-functionalized organosilane and/or oligomer and/or polymer thereof and at least one fatty acid in the composition as well as in the thereof generated coating is preferably in a range of from 1.0:1 to 10:1, more preferably from 1.5:1 to 8.0:1, more preferably from 2.0:1 to 7.5:1, more preferably from 2.5:1 to 5.5:1 and most preferably from 3.0:1 to 4.5:1.

In the generated coating, the content of binder, dried or dried and cured binder may be in the range of from 10 to 90% by weight, of from 35 to 75% by weight or of from 55 to 65% by weight. In the generated coating, the content of binder matrix may be in the range of from 10 to 90% by weight, of from 35 to 75% by weight or of from 55 to 65% by weight.

In the generated coating, the content of sheet silicate pigments may be in the range of from 10 to 90% by weight, of from 15 to 55% by weight or of from 20 to 25% by weight.

In the generated coating, the content of the reaction product c) of at least one amine-functionalized organosilane and/or oligomer and/or polymer thereof and at least one fatty acid may be in the range of from 1 to 20% by weight, of from 1 to 10% by weight or of from 5 to 7% by weight.

The sheet silicate pigments may be treated or may have been treated e.g. chemically or physically or both e.g. with metal, metal oxide, silane or any other substances or not, may perhaps be interference pigments or other coated pigments showing an infrared reflective coating, but more preferred they are untreated which means that they do not have a synthetic coating. Preferably, there are used untreated sheet silicate pigments—which mean that the sheet silicate particles are preferably not coated with a silane, a metal or any other coating material, as it has shown that sheet silicate treated with a metal oxide changes the refractive index and may influence the clearness. Preferably, the sheet silicate pigments do not have any metallized coatings—which mean that these are not metallized sheet silicate pigments, especially, if these coated pigments would create a coloring tint. It has been found that a water content contained in the particles of the sheet silicate pigments is helpful in the emissive behavior of the generated clear or translucent and colorless or nearly colorless emissive coating.

Typically, the sheet silicate pigments emit or reflect or both light especially as visible light or as infrared light or as both. But there may be any sheet silicate pigments that emit or reflect or both light as ultraviolet light or partially in the ultraviolet light. In alternative or in addition thereto, there may be added to the composition and then even contained in the generated emissive coating even any particles or non-particulate substances or both that emit or reflect or both light e.g. as ultraviolet light or partially in the ultraviolet light like invisible fluorescent and like infrared pigments. The content of such particulate or non-particulate substances or both in the composition of the invention may for example be in the range of from 65 to 85 g/l. The content of such particulate or non-particulate substances or both in the generated emissive coating may for example be in the range of from 20 to 25% by weight. Such substances may aid to identify such compositions and coatings and may aid to control the homogeneity and quality of the generated coating too. It is particularly preferred to apply two different mica as sheet silicate pigments.

Preferably, the sheet silicate pigments are selected from the group consisting of mica pigments, coated mica pigments, clay pigments and coated clay pigments. Preferably, these sheet silicate pigments do only have an iron content of less than 5% by weight, of less than 3% by weight, of less than 2% by weight or even of less than 1% by weight. The sheet silicate pigments may be of natural occurrence, of synthetic production, of additional modification or of any combination of these. Then they may have been preferably selected from natural crystallized minerals, from modified natural crystallized minerals or from synthetic crystals or any combination thereof. The sheet silicate pigments may be a composition or a mixture containing one, two, three or even more different types of pigments, e.g. of different grain size distributions, of different average grain sizes, of different average thicknesses, of different pigment minerals, of different mineral chemistries, of different occurrences, of different treatments e.g. of different comminution, disintegration or exfoliation methods, of no or different after-treatment methods like any coating or physical treatment or of any combination thereof. Coated sheet silicate pigments may be of great interest, if they show specific chemical properties or specific physical properties or both in comparison to non-coated sheet silicate pigments.

The sheet silicate pigments may be added as dispersion or as powder or both. The addition as dispersion is preferred. Preferably, it is taken care that the sheet silicate pigments are wetted well with the binder during mixing, e.g. by adding at least one surfactant, by reducing the concentration of the dispersion or by selecting adequate organic polymeric substances that wet easier or by any combination of these.

Preferably, the sheet silicate pigments used for the comminution, disintegration, exfoliation or any combination of these of sheet silicate crystals are free from impurities like other minerals, free from inclusions of iron oxides and/or hydroxides and manganese oxides and/or hydroxides and free from inclusions of other small crystals.

It has been found that the emissive coatings of the invention e.g. having a content of ethylene acrylic copolymer are astonishing clear so that the underlying substrate and e.g. its metallic structure can be excellently seen, if the binder or the binder matrix or both in which the sheet silicate pigments are imbedded, show a refractive index of the same value or of a value nearby those of the sheet silicate pigments.

According to a more preferred embodiment of the invention, a binder matrix is formed primarily from the organic polymeric substances a) and the reaction product c), in which the sheet silicate pigments b) and optionally other particles are imbedded, wherein a coating is formed after applying and drying of the composition and optionally by curing the coating and wherein the binder matrix of the dried or dried and cured coating shows a refractive index n in the range of from 1.45 to 1.70 to be exactly or nearly adapted to the refractive index of the sheet silicate pigments embedded in the binder matrix. It has been found that a binder matrix which has been generated primarily from ionomeric compounds may show a refractive index of about 1.50 to 1.52, which fits excellent to the refractive index of muscovite or similar sheet silicate pigments that often show a mean refractive index of about 1.49 to 1.52.

Often, the refractive index of sheet silicates like e.g. of muscovite mica are in a range of from 1.55 to 1.65. Often, the refractive index of organic polymeric substances is in the range of from 1.30 to 1.65. The refractive index of acrylics may be preferably in the range of from 1.45 to 1.55, especially of from 1.48 to 1.51. The refractive index of urethanes may be preferably in the range of from 1.45 to 1.65, especially of from 1.48 to 1.61. The refractive index of ionomers may be preferably in the range of from 1.42 to 1.58, especially of from 1.48 to 1.54.

Most of these sheet silicate pigments, especially those that are colorless or show only light colors, have a refractive index in the range of from 1.46 and 1.66, preferably in the range of from 1.48 and 1.62 or in the range of from 1.50 and 1.60.

Preferably, the average refractive index nM of the binder matrix deviates from the average refractive index nP of the sheet silicate pigments embedded in the binder matrix—a) in the liquid composition or b) in the coating after applying and drying of the composition or in both cases—with a value of up to +0.10 or up to +0.05 or up to +0.03 or up to +0.01 or up to −0.01 or up to −0.03 or up to −0.05 or up to −0.00.

Preferably, the refractive index nP of the sheet silicate crystals of the pigments used has only a slight or no deviation depending on the different crystallographic directions a to c of the crystals ($\Delta n1$=na−nb or na−nc which difference is bigger) or only a slight or no deviation dependent on the wavelength of the visual light passing the crystals ($\Delta n2$=nviolet−nred="dispersion") or both. Preferably, $\Delta n1$ or $\Delta n2$ or both are not greater than 0.20 or are not greater than 0.10 or are not greater than 0.05. The smaller these values are, the easier it is to generate excellent clear coatings.

The sheet silicate pigments seem to be mostly or always emissive and seem to be mostly reflective as is meant for the measurement of TE (thermal emissivity; in accordance with ASTM C-1371-04a) and TSR (total solar reflectance; in accordance with ASTM C-1549-04). Preferably, there is an addition of any clay, if it has a positive effect on the data of TE, TSR, SRI (solar reflectance index; in accordance with ASTM E 1980-01) or any combination thereof. Clays have shown to optimize the thermal properties as well as the rheological properties. Clays may aid as dispersing agents and perhaps even as film-forming agents. The weight ratio of sheet silicate pigments b) is preferably in the range of from 10 to 60% by weight, more preferably from 20 to 50% by weight and most preferably from 30 to 40% by weight of the polymeric substance content (binder, leveling agent, viscosity modifier etc.) of the composition.

More preferred, the organic polymeric substances a) and the reaction product c) are adapted to have the same or nearly the same refractive index like at least some of the sheet silicate pigments or like the average refractive index of the sheet silicate pigments or both. This may mean, that organic polymeric substances a) are preferably selected that show a refractive index n in a range of from 1.45 to 1.70.

The binder may contain of at least one of organic polymeric substance in a dispersion, emulsion, solution or any combination thereof selected from the group consisting of organic oligomers, organic prepolymers, organic polymers, organic copolymers and any combination thereof, seldom with a content of organic monomers in some embodiments. The binder may contain at least one of organic substances on the base of substances selected from the group consisting of acrylics, alkyds, carbonates, elastomers, epoxies, two component epoxy systems, fluoropolymers, ionomers like ethylene acrylate, ethylene methacrylate, methylene acrylate, methylene methacrylate, acrylate hydrate and methacrylate hydrate, polyesters, polyethers, polyolefins, styrenes, urethanes, vinyls as well as their derivates like esters, their mixtures and their comonomers, cooligomers, copolymers and blockcopolymers of these like urethane-acrylics like vinyl esters, epoxy esters and derivatives of any ionomers. The binder may be further on a polyol two component system, a polyester casting system, a silicone modified alkyd resin system or any system on the base of substances as just mentioned above. The binder may preferably contain at least one of organic substances of acrylic-urethanes, self-crosslinking acrylics, crosslinked acrylics, water resistant styrene-acrylics, acryl-modified fluoropolymers, epoxy esters, polyol two component systems, vinyl esters, two component epoxy systems, acrylic casting systems, polyester casting systems, silicone modified alkyd resins, urethane acrylics and urethane-prepolymers. It preferably contains at least one clear or translucent organic polymeric substance, especially at least one clear or translucent organic polymeric substance as just mentioned here in this paragraph above.

Preferably, there are added further constituents as helpful or necessary constituents for a binder or binder matrix to generate an excellent organic composition and an excellent organic coating: Preferably as matrix for the sheet silicate pigments, especially a combination is used of at least one organic substance to be polymerized or which is already polymerized and of at least one substance selected from the group consisting of amines, anti-blocking agents, catalysts, coalescent agents, crosslinking agents, photoinitiators, slip aids and wetting agents.

For example, in a first group of binders or binder matrices, for the generation of coalescing dried coatings, there may be used e.g. at least one organic substance especially as oligomers, prepolymers, polymers, copolymers or any combination of these like at least one ionomer like ethylene acrylate and/or ethylene methacrylate, and/or like at least one of methylene acrylates, methylene methacrylates, acrylate hydrates and methacrylate hydrates, like styrene acrylate or like at least one of acrylics, polyesters, polyethers, and urethanes or any combination thereof.

The content of ionomerics in the organic polymeric substances a) or in the binder or in the binder matrix is preferably in the range of from 80 to 100% by weight, more preferably from 90 to 100% by weight and most preferably from 95 to 99% by weight.

The content of all organic polymeric substances a) in the composition is in the range of from 50 to 300 g/l, preferably in the range of from 100 to 280 g/l, of from 120 to 260 g/l, of from 150 to 240 g/l or of from 180 to 220 g/l.

The content of ionomerics in the composition is preferably in the range of from 20 to 300 g/l, more preferred in the range of from 60 to 270 g/l, of from 100 to 250 g/l, of from 140 to 230 g/l or of from 175 to 215 g/l.

The content of ionomerics in the dried or dried and cured binder matrix, especially of the emissive coating, is preferably in the range of from 80 to 100% by weight, more preferably from 90 to 100% by weight and most preferably from 95 to 99% by weight.

The content of ionomerics in the coating may be in the range of from 10 to 90% by weight, of from 35 to 75% by weight or of from 55 to 65% by weight.

Preferably, the composition or the thereof generated coating or both contain a mixture of ionomerics and acrylics like hydroxylated acrylic or self-crosslinking acrylic or both especially as at least one emulsion or a mixture of ionomerics and urethane-acrylics like self-crosslinking polyurethane acrylic acid copolymer especially as at least one dispersion or a mixture of ionomerics and urethanes especially as at least one dispersion or any combination thereof. The total contents of the acrylics or of the urethane-acrylics or of the urethanes or of any combination thereof in the composition or in the thereof generated coating or both are preferably in the range of from 1 to 80% by weight, more preferred in the range of from 5 to 75% by weight, of from 10 to 70% by weight, of from 20 to 65% by weight, of from 25 to 60% by weight, of from 30 to 55% by weight, of from 35 to 50% by weight or of from 40 to 45% by weight. Preferably, the weight ratio of ionomerics to acrylics or to urethane-acrylics or to urethanes or to any combination thereof in the composition or in the thereof generated coating or both are preferably in the range of from 8:1 to 1:8, of from 6:1 to 1:6, of from 4:1 to 1:4, of from 3:1 to 1:3, of from 2:1 to 1:2 or of from 1.5:1 to 1:1.5.

Then it is preferred to add at least one coalescent agent to assist in the homogenization of the organic substances especially during drying of the coating.

According to a first preferred embodiment, these coalescent agents may be selected from long-chain alcohols having 4 to 24 C atoms. The so-called long-chain alcohols are particularly advantageous for aiding in film-formation They have preferably 4 to 20 C atoms or 5 to 18 C atoms or 6 to 16 C atoms, particularly preferably 8 to 12 C atoms. Preferable examples of these are: butylene glycols, butylene glycol ethers, ethylene glycols, ethylene glycol ethers such as ethylene glycol monobutyl ether, ethylene glycol monoethyl ether, ethylene glycol monomethyl ether, ethyl glycol propyl ether, ethylene glycol hexyl ether, diethylene glycol methyl ether, diethylene glycol ethyl ether, diethylene glycol butyl ether and diethylene glycol hexyl ether, propylene glycols, propylene glycol ethers such as propylene glycol monomethyl ether, dipropylene glycol monomethyl ether, tripropylene glycol monomethyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monopropyl ether and propylene glycol phenyl ether.

According to a second preferred embodiment, the coalescent agents may be selected from amines, more preferred from trialkylamines. An especially preferred trialkylamine is N,N-dimethylisopropanolamine or 2[(1-methylpropyl)amino]ethanol, mostly preferred N,N-dimethylisopropanolamine.

The total content of coalescent agents in the composition is preferably in a range of from 0.05 to 50 g/l, of from 1 to 30 g/l, of from 5 to 20 g/l or of from 10 to 15 g/l. In some embodiments, the addition of two or three different coalescent agents having different glass transformation temperatures Tg is preferred.

The coalescent agents may assist in film formation, preferably by lowering the drying temperature or the glass transformation temperature Tg or both, in many cases even without use of any crosslinking agent and without use of any photoinitiator. Further on, the addition of at least one crosslinking agent especially on the base of a zirconium compound is especially preferred. The content of at least one zirconium compound in the composition is preferably in the range of from of from 1 to 20 g/l, of from 1 to 10 g/l or of from 3 to 7 g/l. The drying and coalescing may preferably occur at a temperature in the range of from 20° C. to 150° C., more preferred in the range of from 30° C. to 120° C., especially if coalescent agents are used without any crosslinking agent. The drying and coalescing may preferably occur at a temperature in the range of from 50° C. to 350° C., more preferred in the range of from 80° C. to 250° C. or of from 90° C. to 180° C. The drying and coalescing may preferably be used if at least one coalescent agent is used a) together with any crosslinking agent like a zinc compound, a zirconium compound, a compound on the base of melamine, isocyanate, isocyanurate, silane or any combination thereof. Or the drying and coalescing may preferably be used if at least one coalescent agent is used b) together with any oxidative drying agent for crosslinking an alkyd resin containing double bonds or c) together with any autooxidation process catalyzed by at least one transition metal salt or d) together with any drier such as cobalt naphthenate or any combination of a) to d) thereof.

In some embodiments it is preferred that the temperatures do not to exceed 60° C. not to cause crosslinking with a chelate if this is present—because of the stability of the dispersion.

Of course, there may be added at least one amine d) or any other additive e) or both.

Such compositions have shown to be easy to be produced, to form a good binder matrix, to be stable, well applicable and not too expensive. The thereof generated coatings have shown to be even more corrosion resistant, adhere well to the substrate surface and are excellent as carrier for sheet silicate pigments to create excellent emissive coatings that are mostly clear or at least translucent and that are often colorless or at least nearly colorless. They show excellent data for TE, TSR and SRI.

2.) For example, in a second group of binders or binder matrices, for the generation of dried and chemically cured coatings e.g. by thermal influence, there may be used e.g. at least one organic material especially as oligomers, prepolymers, polymers, copolymers or any combination of these like at least one ionomeric like ethylene acrylate, like any styrene acrylate, like at least one other acrylic, like at least one methacrylate etc.

Then it is preferred to add at least one crosslinking agent to assist in the chemical curing of the organic substances especially during drying or heating or both of the coating. These crosslinking agents may preferably be selected from the group consisting of isocyanates, isocyanurates, melamines, zinc compounds and zirconium compounds, more preferred a zirconium ammonium carbonate, a zinc oxide or both. Or there may be used any organic polymeric substances having any such groups instead or additionally to these crosslinking agents. Of course, there may be added at least one other additive e).

3.) For example, in a third group of binders or binder matrices, for the generation of dried and radically cured coatings by e.g. by UV radiation or any short wave energy-rich radiation, there may be used e.g. at least one organic material especially as oligomers, prepolymers, polymers, copolymers or any combination of these containing at least one acrylic, at least one epoxy, at least one ionomeric like ethylene acrylate, at least one polyester, at least one polyether, at least one urethane like acrylate-urethane or any combination of these.

Then it is preferred to add at least one photoinitiator to assist in the curing of the organic substances especially during UV cure and perhaps even on an additional thermal precure or postcure of the coating. These photoinitiators may be selected from any photoinitiators well-known in the art. Of course, there may be added at least one other additive e).

The dispersion, emulsion, solution or any combination thereof may contain essential contents of water or of at least one organic solvent or of at least one reactive diluent or any combination thereof. More preferred, a binder or binder matrix 1.) especially for drying and coalescing contains as solvents only water and coalescent agent(s). More preferred, a binder or binder matrix 2.) especially for chemically curing contains as solvents only water and optionally coalescent agent(s) and organic solvent(s). More preferred, a binder or binder matrix 3.) contains as solvents only water or even only traces of water and optionally only traces of other organic solvent(s).

In general, the composition of the present invention may preferably be an alkaline system containing additionally d) 0.05 to 50 g/l of at least one amine. The amines may in some cases be important for improving the stability of the resins and may be often important for the behavior in the presence of surfactants, especially of anionic surfactants. Especially preferred is an addition of at least one volatile amine that is able to air-dry like N,N-dimethylisopropylamine or 2[(1-methylpropyl)amino]ethanol or both. The content of at least one amine d) in the composition is preferably in a range of from 1 to 30 g/l, of from 5 to 20 g/l or of from 10 to 15 g/l. The weight ratio of amines d) to organic polymeric substances a) is preferably in the range of from 1 to 15% by weight of the content of organic polymeric substances a), more preferred in the range of from 3 to 10 or 5 to 8% by weight. It has shown to be significantly advantageous if these ranges of contents are maintained to stabilize the viscosity and odour generation. The amount of amine depends preferably on the resin system. It is preferred that an ionomeric system does not have more than 1.4% by weight of at least one amine. Most of the organic polymeric substances have a content of at least one amine in the range of from 0.2 to 1.0% by weight. But the composition of the present invention may in alternative thereto preferably be an acidic system containing additionally at least one acidic constituent like a fluoro acid or a phosphorus containing acid or both.

Preferably, the composition contains additionally e) 0.5 to 100 g/l of at least one of the additives selected from the group consisting of at least one of coalescent agents, co-solvents, crosslinking agents, defoamers, dispersing agents, photoinitiators, plastizisers, slip agents, surfactants, thixotropes, UV absorbing substances, waxes and wetting agents.

The coalescent agent acts as a film-forming agent and the co-solvent acts as a volatile film-forming agent, wherein the film-forming agent is used to lower the glass transformation temperature Tg at a certain temperature range to be able to coalescence the organic polymeric particles to a closed film, especially during drying. The plastiziser has an effect to soften the drying and the dry coating. Moreover, the corrosion resistance of aluminum containing surfaces may be further improved in comparison to coatings without any pretreatment layer and/or any paint layer below, if an emissive coating according to the invention is generated. The high corrosion resistance is significantly positively influenced by the addition of a significant content of sheet silicate pigments b) as well as of the reaction product c), too.

The surfactant may assist to stabilize the dispersion, emulsion or any combination thereof. The wetting agent improves the wetting behavior on the substrate. The content of all additives e) in the composition is preferably of from 1 to 100 g/l, of from 20 to 90 g/l or of from 40 to 70 g/l. An added singular additive e) may be preferably contained in the composition with a content of from 0.5 to 15 g/l. The weight ratio of additives e) to organic polymeric substances a) is preferably in the range of from 5 to 50% by weight of the content of organic polymeric substances a), more preferred in the range of from 10 to 40 or 25 to 35% by weight.

As the UV absorbing substances, many substances may be added. Preferably, a triazole base substance is added to the composition. Most preferred, hydroxyphenylbenzotriazole is added as UV absorbing substance, as it does not or not substantially influence or affect the thermal properties of the composition and of the thereof generated coating.

Preferably, the composition contains additionally f) 0.5 to 30 g/l of at least one of crosslinking agents and photoinitiators, especially a crosslinking agent selected from the group consisting of at least one of isocyanates, isocyanurates, melamines, zinc compounds and zirconium compounds, more preferred a zirconium ammonium carbonate, a zinc oxide or both. The content of all crosslinking agents and photoinitiators f) in the composition is preferably of from 1 to 20 g/l, of from 1 to 10 g/l or of from 3 to 7 g/l. The weight ratio of crosslinking agents f) to organic polymeric substances a) is preferably in the range of from 0.5 to 10% by weight of the content of organic polymeric substances a), more preferred in the range of from 1 to 7 or 1 to 4% by weight. As zirconium ammonium carbonate may additionally show the function of a chelating agent, it is in this application only calculated as a crosslinking agent. It has shown to be significantly advantageous if the ranges of content show 1.0% by weight of substances f) or less, as otherwise it might affect the stability of the dispersion.

Preferably, the composition contains additionally g) 0.5 to 30 g/l of at least one of chelating agents and chelates, especially selected from the group consisting of at least one of tartrates, tartaric acid and a water-soluble or water-dispersible organic titanium chelate compound. The content of all chelating agents and chelates g) in the composition and in the coating—calculated as added contents and not as reacted compounds in the generated coating—is preferably of from 1 to 20 g/l, of from 1 to 10 g/l or of from 3 to 7 g/l.

Preferably, the composition contains additionally h) 1 to 100 g/l of at least one silane, especially at least one silane, especially selected from the group consisting of alkoxysilanes, epoxysilanes, at least one nitrogen containing group containing silanes and oligomeric silanes, calculated as corresponding silanes added and not calculated as silanols, not calculated as siloxanes, not calculated as polysiloxanes and not calculated as further on modified compounds. The silanes added may be non-hydrolyzed—especially contained in an alcoholic solution—or partially or totally hydrolyzed and then especially contained in an aqueous solution. The condensation or polymerization of the silanes or silanols may have already started to siloxanes. The silanes added may have been already partially crosslinked or polymerized so that they are oligomers. The silanes may have been modified e.g. so that they show several groups per molecule binding to the substrate surface or e.g. so that they have a certain oligomeric structure or both. There may have been added before any further compound to the silane containing solution like acetic acid or there may have been any chemical reaction before generating or adding e.g. an alcohol or any acid. They may have been chemically modified, e.g. functionalized or brought into an oligomeric or even polymeric condition. The at least one nitrogen containing group containing silanes may show at least one of amido groups, amino groups, imido groups, imino groups, urea groups or any combination thereof. They may be selected from any kind of amidosilanes, aminosilanes, imidosilanes, iminosilanes, or ureasilanes or any combination thereof. The at least one nitrogen containing group containing silanes and especially the aminosilanes may show one, two, three or even more nitrogen containing groups per molecule like amino groups.

The content of all silanes h) in the composition is preferably of from 2 to 50 g/l, of from 4 to 25 g/l or of from 6 to 10 g/l. The weight ratio of silanes h) to organic polymeric substances a) is preferably in the range of from 1 to 30% by weight of the content of organic polymeric substances a), more preferred in the range of from 1 to 10 or 2 to 6% by weight. It has shown to be significantly advantageous if the addition of silanes h) is 5% by weight of the content of organic polymeric substances a) or less, as this might affect the water sensitivity of the coating.

In the generated coating, the content of silane, siloxane and polysiloxane, which is not reacted with other compounds of the composition, may be in the range of from 0.5 to 10% by weight, of from 1 to 7% by weight or of from 1 to 4% by weight.

Finally, there may be a content of at least one organic solvent, especially of at least one of alcohols, especially of alcohols having 1 to 4 carbon atoms with 1 hydroxy group each or of glycol ethers or of ketones or of both, or any mixture therewith, preferably in an amount in the range of from 0.01 to 500 g/l. The content of all organic solvents except of coalescent agents in the composition is preferably of from 0.2 to 400 g/l, of from 1 to 300 g/l, of from 5 to 200 g/l, of from 10 to 150 g/l, of from 20 to 120 g/l, of from 30 to 100 g/l, of from 40 to 80 g/l or of from 50 to 65 g/l. Such organic solvent or solvent mixture may additionally contain a low or high content of water or no water. Many compositions according to the invention are free or nearly free of such organic solvents. Then these compositions may contain in alternative water or any reactive diluents or both. Then, the chemical system may be a pure aqueous system or an aqueous system with a minor amount of organic solvent. In many instances, an aqueous system or even an aqueous system free of organic solvent is most preferred. The content of water in the composition is preferably of from 100 to 900 g/l, of from 350 to 800 g/l or of from 600 to 700 g/l.

Preferably, the composition has a zeta potential in the range of from −30 to −70 mV or more preferred of from −40 to −50 mV. It has been found that a zeta potential of this range as measured with a Brookhaven Instrument BIC 90Plus Particle Size Analyzer in combination with a BI-Zeta Instrument used together with 90Plus Bi-Zeta Software indicates that the liquid composition is in a stable condition. The zeta potential is only measured in an aqueous system. The zeta potential may preferably be adapted to be in the range of from −30 to −70 mV, especially by changing the concentration of the dispersion e.g. by water addition. The stability of the dispersion may be controlled by controlling the zeta potential of the dispersion. If the zeta potential of the dispersion should be greater than −70 mV, there should not be a problem, but if the zeta potential would be less of −35 mV (like for −20 mV), there may occur a problem with the stability of the dispersion.

In the process of the invention, there are nearly all industrial application methods for the application of the composition onto the substrate surface possible. It is preferred that the composition is applied onto the substrate surface by brushing, dipping, direct roll-coating, reverse roll-coating, spraying or any combination thereof. Most often, coil coating is used e.g. with reverse roll-coating. In the production of corrugated sheets made of Galvalume®, it has shown to be significantly advantageous if processed by reverse roll-coating.

Preferably, the liquid film applied on a substrate surface has a film thickness in the range of from 0.01 to 2000 µm, preferably the liquid film has a thickness in the range of from 0.05 to 1500 µm, of from 0.1 to 1200 µm, of from 0.3 to 1000 µm, of from 0.6 to 800 µm, of from 1 to 600 µm, of from 2 to 500 µm, of from 3 to 400 µm, of from 5 to 300 µm, of from 8 to 250 µm, of from 12 to 200 µm, of from 18 to 180 µm, of from 24 to 160 µm, of from 30 to 140 µm, of from 40 to 120 µm, of from 50 to 100 µm, of from 60 to 90 µm or from 70 to 80 µm. In many embodiments, the coating thickness will be in the range of from 15 to 55 µm.

The coating weight and the coating thickness of a type of emissive coating depends significantly from the application and the substrate used. As for Galvalume®, the generated dried or dried and cured coating according to the invention has a preferred coating weight in the range of from 0.01 to 2000 g/m2, preferably a coating weight in the range of from 0.05 to 1500 g/m2, of from 0.1 to 1200 g/m2, of from 0.3 to 1000 g/m2, of from 0.6 to 800 g/m2, of from 1 to 600 g/m2, of from 2 to 500 g/m2, of from 3 to 400 g/m2, of from 5 to 300 g/m2, of from 8 to 250 g/m2, of from 12 to 200 g/m2, of from 18 to 180 g/m2, of from 24 to 160 g/m2, of from 30 to 140 g/m2, of from 40 to 120 g/m2, of from 50 to 100 g/m2, of from 60 to 90 g/m2 or from 70 to 80 g/m2. In many embodiments, the coating weight will be in the range of from 10 to 85 g/m2, especially on metallic surfaces often in the range of from 5 to 28 g/m2.

Preferably, the generated dried or dried and cured coating according to the invention has a coating thickness in the range of from 0.005 to 1000 µm, preferably a coating weight in the range of from 0.025 to 750 µm, of from 0.05 to 600 µm, of from 0.1 to 500 µm, of from 0.3 to 400 µm, of from 0.5 to 300 µm, of from 1 to 250 µm, of from 1.5 to 200 µm, of from 2.5 to 150 µm, of from 4 to 125 µm, of from 6 to 100 µm, of from 9 to 90 µm, of from 12 to 80 µm, of from 15 to 70 µm, of from 20 to 60 µm, of from 25 to 50 µm, of from 30 to 45 µm or from 35 to 40 µm.

In the process of the invention, the peak-metal-temperature of the just coated substrate surface may have quite different temperatures. For some embodiments like in coil coating, it is preferably in the range of from 70 to 170° C. or from 90 to 140° C. This temperature, as it is often used for coil-coating, has the advantage that the composition applied can dry within few seconds so that there is no need for any further heating or any longer distance of the coil coating line until the next coating station. For heat-sensitive substrates or substrate materials or both, it is specifically preferred to apply a composition of the first group of binders or binder matrices 1.) which needs only a drying at a limited drying temperature or to apply a composition of the first group of binders or binder matrices 1.) which needs only a drying at a limited drying temperature preferably in a range of from 15 to 80° C. or of from 20 to 50° C. and preferably only a short drying e.g. of less than 5 minutes. In alternative thereto, there may be applied on heat-sensitive substrates or substrate materials or both a composition of the first group of binders or binder matrices 3.) which needs only a drying at a limited drying temperature in a range of from 15 to 50° C. and a curing with energy-rich radiation like UV radiation in such way that even thereby there is only a limited heating up combined with such irradiation.

In the process of the treatment of aluminum containing surfaces, there may be first an acidic or alkaline cleaning, an etching, a pickling, any rinsing e.g. with water, any heating or any combination thereof, prior to the application of the emissive coating or prior to a pretreatment which is prior to the application of the emissive coating.

In the process of the invention, the composition may be preferably applied onto a pretreated aluminum containing surface. Thereby, the corrosion resistance and the adhesion of the emissive coating on a substrate surface or on an already pretreated or precoated substrate surface may be further improved in comparison to coatings without any pretreatment coating below.

In one variety of the process of the invention, the composition is preferably applied onto a painted substrate surface or onto a paint layer which is located on any kind of substrate. Thereby, the emissivity and further thermal properties are improved. In another very favorable embodiment, the emissive coating of the present application may be modified in such way that it has a micro-roughened surface to gain a lotus effect by the topology of the micro-rough surface or that at least one hydrophobic substance is added to the composition to generate a lotus effect by the hydrophobic surface of the coating or by both. The micro-roughening may be generated by varying the concentration or viscosity or both during the application of a composition with a high content of sheet silicate pigments, which preferably show at least two peaks of very different particle sizes. The hydrophobicity of the generated coating may be gained by adding at least one hydrophobic organic polymeric substance a) like a fluoropolymer or a polyolefin, e.g. even in the form of fine particles, or by adding a considerably high proportion of at least one silane generating a sufficient hydrophobicity or by adding a content of at least one fluorosilane or both.

Further on, the corrosion resistance of the aluminum containing surfaces may be further improved in comparison to coatings without any pretreatment layer and/or any paint layer below, if an emissive coating according to the invention is generated. The high corrosion resistance is significantly positively influenced by the addition of a significant content of sheet silicate pigments b) as well as of the reaction product c) and the quality of the sheet silicate pigments too. The quality of the sheet silicate pigments, especially of the mica pigments, may be measured by electrical conductivity: The higher the electrical resistance, the better seems the quality of the sheet silicate pigments to be.

In the process of the invention, there may be a skin pass composition preferably additionally applied prior to the application of the composition for clear or translucent and colorless or nearly colorless emissive coating. Such a skin pass composition respectively the thereof generated thin coating has the advantage that it often enhances the corrosion resistance of the aluminum containing surface significantly. The skin pass coating may help as a mobility enhancer e.g. in a coil coating line, which assists in the unproblematic transportation of coil especially with high speed in the coil coating line. Further on, a skin pass composition or another kind of pretreatment composition may be applied first on an existing paint layer, so that it may be afterwards coated with the emissive coating according to the invention.

Preferably, the skin pass composition is a pretreatment composition. The skin pass composition may be applied to gain an even higher corrosion resistance, a better adhesion of the emissive coating onto the substrate surface, to flatten and smoothen the substrate surface and to prevent galling of the substrate surface especially during the leveling process of the coil coating line used. A skin pass composition like Gardolube® L 8250 may be more preferred applied. This product is a mixture containing different amines, different alcohols and further organic solvent, which mixture may even have a chelating effect. Therefore, a skin pass composition may preferably contain at least one amine, at least one alcohol and at least one organic solvent. But alternatively, other types of pretreatment may be used in alternative or additionally like an alkali metal phosphating, a zinc phosphating, a silane coating etc., but some of these may optically cover the structure of the substrate surface. These pretreatments aid e.g. in corrosion resistance and paint adhesion.

According to the present invention, a clear or translucent and colorless or nearly colorless emissive coating may be prepared with a composition of the invention.

In the generated emissive coating according to the invention, there are preferably 35 to 75% by weight of organic polymer(s) a), 15 to 55% by weight of sheet silica pigment(s) b) and 1 to 10% by weight of the reaction product c).

In some embodiments, the emissive coating is characterized in that it has a content of binder a) and pigment b) in a pigment-to-binder weight ratio in the range of from 0.1:1 to 0.6:1, preferably from 0.2:1 to 0.5:1 and more preferably from 0.3:1 to 0.4:1.

The content of binder a) (organic polymeric substances) and pigment b) (sheet silicate pigments) in a pigment-to-binder weight ratio is preferably in the range of from 0.1:1 to 0.6:1, preferably from 0.2:1 to 0.5:1 and more preferably from 0.3:1 to 0.4:1. The weight ratio of sheet silicate pigments b) to the reaction product c) in the emissive coating is preferably in the range of from 100 to 900%, of from 150 to 700%, of from 250 to 500% or of from 350 to 400% by weight of the reaction product c). The weight ratio of organic polymeric substances a) to the reaction product c) in the emissive coating is in the range of from 200 to 5.000%, of from 500 to 3.000%, of from 700 to 2.000% or of from 900 to 1.100% by weight of the reaction product c).

Further on, the generated emissive coating according to the invention may contain at least one amine or reacted amine or both d) or any reaction product thereof or any combination of these in a total content of from 0.05 to 8%, especially of from 0.5 to 5% by weight. The amount of amine depends significantly from the resin system used.

Further on, the generated emissive coating according to the invention may contain at least one additive e) in a content (per single additive) of from 0.05 to 15% by weight, of from 0.05 to 12% by weight, of from 0.1 to 10% by weight, of from 0.1 to 8% by weight or of from 0.15 to 5% by weight.

Further on, the generated emissive coating according to the invention may contain at least one crosslinking agent or reacted agent or both f) in a total content of from 0.1 to 40%, especially of from 0.5 to 20% or of from 1 to 12% by weight.

Further on, the generated emissive coating according to the invention may contain at least one chelating agent or chelate or both g) in a total content of from 0.1 to 5% by weight, of from 0.2 to 4% by weight or of from 0.3 to 3% by weight.

Further on, the generated emissive coating according to the invention may contain at least one silane or silyl groups bound by reaction or both h) in a total content of from 0.1 to 30%, especially of from 1.0 to 20%, of from 1.5 to 15% by weight or of from 2.0 to 3.0% by weight.

The content of at least one amine d) in the composition is preferably in a range of from 1 to 30 g/l, of from 5 to 20 g/l or of from 10 to 15 g/l.

The content of all additives e) in the composition is preferably of from 1 to 75 g/l, of from 10 to 50 g/l or of from 30 to 40 g/l. An added singular additive e) may be preferably contained in the composition of 0.5 to 15 g/l.

The content of all crosslinking agents and photoinitiators f) in the composition is preferably of from 1 to 20 g/l, of from 1 to 10 g/l or of from 3 to 7 g/l.

The content of all chelating agents and chelates g) in the composition and in the coating—calculated as added contents and not as reacted compounds in the generated coating—is preferably of from 1 to 20 g/l, of from 1 to 10 g/l or of from 3 to 7 g/l.

The content of all silanes h) in the composition is preferably of from 2 to 50 g/l, of from 4 to 25 g/l or of from 6 to 10 g/l.

Finally, the generated emissive coating according to the invention may additionally contain at least one UV light adsorbing substance so that there is a further protection of the emissive coating against degradation by UV light.

The microscopic structure of the emissive coating according to the invention typically shows under a scanning electron microscope a uniform distribution of sheet silicate pigments within the binder matrix. Preferably, the generated coatings do only show these two phases.

Certain organic polymers such as polyesters are known to be sensitive to solar-induced heat build-up and may lose gloss and may change color, color intensity as well as other chemical and physical properties. Therefore, it is expected that the emissive coatings of the present invention will have the advantage to conserve much longer than similar conventional coatings their original properties, as they do not heat up as much if they are used in areas with high solar irradiance.

In a preferred embodiment of the present invention, the cool element may have either A) an emissive coating with a gradient towards the outer surface with an increasing content of a silane or of a polysiloxane or of a fluorine compound or of any combination thereof towards its surface or with a gradient with an increasing hydrophobicity towards its surface or it may be hydrophobic itself or it may have a surface showing characteristics of a lotus effect surface or any combination thereof, or the cool element may have B) additionally upon the emissive coating or below the emissive coating, a layer with a content of silane, siloxane or polysiloxane or any combination thereof or with a hydrophobicity or with a surface showing characteristics of a lotus effect surface or any combination of these.

In case A), the emissive coating may show a gradient towards the outer surface with an increasing content of a silane or of a siloxane or of a polysiloxane, of a fluorine compound or of any combination thereof towards its surface or may show a gradient with an increasing hydrophobicity towards its surface or may be hydrophobic itself or may have a surface showing characteristics of a lotus effect surface or any combination thereof. The hydrophobic properties of the emissive coatings are preferably generated with the aid of any silane, of any siloxane, of any polysiloxane, of any fluorine compound or of any combination thereof. The lotus effect may be generated either by hydrophobic effect at the surface or by its specific microstructure or by both.

Especially in case B), the additional layer upon or below the emissive coating may have at least one UV absorbing substance to be further protected against UV degradation and to protect the underlying layers, coatings and substrates.

According to the present invention, there is a method of use of clear or translucent and colorless or nearly colorless emissive coatings on any surfaces for cool elements like cool roofing elements, on exterior elements of aeroplanes, of automobiles, of bicycles, of ships, of trains, of rockets, of satellites, of exterior antennae, of architectural exterior elements, of guard-rail elements, of tanks and of exterior chemical plant elements.

Further on, it was surprising that the reaction product c) of at least one amine-functionalized organosilane and/or oligomer and/or polymer thereof and at least one fatty acid considerably improves the corrosion resistance, so that a clear organic polymeric coating on aluminum containing surfaces which typically has a corrosion resistance of about 800 hours—depending on thickness and binder quality—with <5% white/black rust (no stains/watermarks) tested with NSS in accordance with ASTM B 117 may gain—by addition of the reaction product c)—a corrosion resistance of more than 800 hours and up to 1000 hours with <5% white/black rust (no stains/watermarks).

Further on, it was surprising that the reaction product c) improved the paint adhesion of organic polymeric coatings in such way that corrosion at the scribe was significantly reduced.

Further on, it was surprising that the reaction product c) added to the coating did not result in defects affecting other properties.

It was found that the clear emissive coating can be applied without any special equipment e.g. in a steel mill, which is significantly advantageous for cost.

The present invention should be pointed out by the following examples without thereby limiting the scope of the invention.

EXAMPLES

The examples and comparison examples described in the following are intended to elucidate the subject-matter of the invention in more detail. The specified concentrations and compositions relate to the composition as used in the bath or as added to the bath or both and need not be identical with the initial solutions/dispersions of mostly higher concentrations (concentrates) or with the replenishing solutions/dispersions to replenish the consumption of chemical constituents in the bath. Commercially available panels of Galvalume® (55% AlZn) were used for the following experiments and tests.

First, the panels were degreased in an alkaline spray cleaner. Then, the panels were treated with a comparison composition (CE) being an aqueous dispersion of
- a) 199 g/l of ionomeric ethylene acrylic acid copolymer (melting point: 77° C., melt index: 300, molecular weight: about 8.000, Tg: about −8° C.),
- b) 75 g/l of sheet silicate (natural mica, d50<10 μm),
- c) none,
- d) 13 g/l of dimethylisopropanolamine,
- e) 23.3 g/l of other additives including defoamer (2.5 g/l, pH buffer (3.8 g/l, leveling agent (1.8 g/l, viscosity modifier (2.1 g/l, UV absorbent (8.4 g/l), anti-oxidant (4.7 g/l),
- f) 5 g/l of ammonium zirconium carbonate,
- g) none, and
- h) 8.3 g/l of 3-aminopropyltriethoxysilane and, alternatively, with a composition according to the invention (E) also being an aqueous dispersion of the above components a), b), d) to f) and h) and additionally containing
- c) 20 g/l of the reaction product of 3-aminopropyl triethoxysilane and erucic acid.

At that, said component c) was produced as follows:
- i. 0.8 g of 3-aminopropyl triethoxysilane and 1.2 g of erucic acid were mixed, and
- ii. the resulting mixture was subjected for 40 minutes to room temperature under mixing.

The reaction product c) was then analyzed by FT-IR. According to the peak intensity ratio of the amide bond at 1640 cm-1 and the carboxylic acid/amine salt bond at 1560 cm-1, approx. 10 mol-% of the linkages between aminopropyl triethoxysilane and erucic acid were amide bonds.

Subsequently, 2.0 g of the reaction product c) were dropped into 98 g of the comparison composition (CE) to obtain the composition according to the invention (E).

In the treatment of the panels, a defined quantity of the according composition (CE or E; bath dispersion) was applied in such a way with the aid of a roll coater that a wet film thickness e.g. of about 21 g/m² arose. The according composition was applied at a temperature of about 20° C. with a velocity of about 220 m/min. Subsequently, the wet film was dried at a temperature of about 65.5° C. (150 F) PMT (peak-metal-temperature) which needs about 140° C. of a laboratory convection oven for 25 seconds of time in the oven. The dry films (=the emissive coatings) showed a coating weight mostly in the range of about 8 to 12 g/m².

The following tests were performed exactly as described in the standards.

i) NSS test according to ASTM B 117:

| Example | <5% white/black rust (no stains/watermarks) |
|---|---|
| CE | Fail after 1000 hours: >30% spots |
| E | Pass after 1000 hours: <5% spots | ii) QUVa test in accordance with ASTM D4587:

| Example | ΔE < 3%, gloss retention > 60% |
|---|---|
| CE | Fail after 2000 hours: ΔE < 3.0% < 60% of gloss retention |
| E | Pass after 2000 hours: ΔE < 3.0% > 60% of gloss retention |

As may be clearly seen, the addition of the reaction product c) to composition E clearly enhances the anti-corrosion as well as the anti-UV degradation properties of the resulting emissive coating in comparison to composition CE without such a component added.

Concerning other corrosion tests, with both compositions CE and E the requirements in the US as well as in Canada are met:

| Test | Requirements |
|---|---|
| Wet Stack | 12 weeks with no stains nor rust |
| Cleveland Condensing Humidity | 2000 hours < 5% white rust |
| Water Immersion | 2000 hours with no stains nor rust |

Discoloration of organic coatings can be caused by oxidation as well as by UV degradation of the polymers contained.

It has been found that the addition of the reaction product c) reduces significantly the coloration of the emissive coatings under sun light exposure (long-term outdoor exposure). This leads to the effect that there is no or nearly no discoloration of a coating exposed to sun light for one or several years because of the addition of the reaction product c).

The invention claimed is:

1. A composition for applying a clear or translucent emissive coating on an aluminum containing surface, the composition comprising, in a dispersion:
   - a) 50 to 300 g/l of at least one of clear or translucent organic polymeric substances a) of a binder; and
   - b) 30 to 300 g/l of sheet silicate pigments b) having a TE value for the thermal emissivity of at least 0.40, having a particle size distribution of which $d_{50}$ is in the range of 0.3 to 80 μm and having been comminuted, disintegrated, exfoliated or any combination of these to thin particles;

wherein the composition further comprises:
   - c) a reaction product of at least one amine-functionalized organosilane and/or oligomer and/or polymer thereof and at least one fatty acid, wherein a molar ratio of an amino group/s of the at least one amine-functionalized organosilane and/or oligomer and/or polymer thereof and of the at least one fatty acid is 1.2:1 to 1:2, and wherein the at least one amine-functionalized organosilane and/or oligomer and/or polymer thereof is linked to the at least one fatty acid by at least one carboxylic acid/amine salt bond and/or by at least one amide bond.

2. The composition according to claim 1 characterized in that at least 5 mol-% of the linkages (detected by FT-IR spectroscopy) between the at least one amine-functionalized organosilane and/or oligomer and/or polymer thereof and the at least one fatty acid are amide bonds.

3. The composition according to claim 1 characterized in that the at least one amine-functionalized organosilane and/or oligomer and/or polymer thereof is an aminoalkyl trialkoxysilane, and/or an oligomer and/or polymer thereof.

4. The composition according to claim 1 characterized in that the composition comprises at least one oligomer and/or polymer of an amine-functionalized organosilane.

5. The composition according to claim 1 characterized in that the at least one fatty acid has at least 8 carbon atoms.

6. The composition according to claim 1 characterized in that the at least one fatty acid has a hydrocarbon tail exhibiting at least one C=C double bond.

7. The composition according to claim 1 characterized in that the at least one fatty acid is erucic acid.

8. The composition according to claim 1 characterized in that the at least one amine-functionalized organosilane and/or oligomer and/or polymer thereof is present in a concentration of 0.5 to 40 g/l, and that the at least one fatty acid is present in a concentration of 0.5 to 40 g/l.

9. The composition according to claim 1 characterized in that the molar ratio of the amino groups of the at least one amine-functionalized organosilane and/or oligomer and/or polymer thereof and of the at least one fatty acid is 1.1:1 to 1:1.5.

10. The composition according to claim 1 characterized in that a binder matrix is formed from the organic polymeric substances a), the reaction product c) and other substances added except of the sheet silicate pigments b), wherein a coating is formed after applying and drying of the composition and wherein the binder matrix of the dried or dried and cured coating shows a refractive index n in the range of from 1.45 to 1.70 to be exactly or nearly adapted to the refractive index of the sheet silicate pigments embedded in the binder matrix.

11. The composition according to claim 1 characterized in that the composition comprises at least one ionomeric compound, at least one acrylic substance, at least one methacrylic substance, at least one urethane substance, any derivative of any of these, any modification of any of these or any combination thereof.

12. A process for applying a clear or translucent emissive coating on an aluminum containing surface, the process comprising applying the composition according to claim 1 on an aluminum containing surface, wherein the coating is dried and wherein the dried coating has a coating weight in the range of from 0.2 to 2000 g/m².

13. The process according to claim 12 characterized in that the composition has a zeta potential in the range of from 30 to 70 mV.

14. The process according to claim 12 characterized in that the composition is applied onto the aluminum containing surface by brushing, dipping, rollcoating, inverse rollcoating, spraying or any combination thereof.

15. The process according to claim 12 characterized in that the peak-metal-temperature of the just coated aluminum containing surface is in the range of from 70 to 170° C.

16. The process according to claim 12 characterized in that the aluminum containing surface comprises at least one aluminum alloy.

17. The process according to claim 12 characterized in that the composition is applied onto a pretreated aluminum containing surface.

18. The process according to claim 12 characterized in that there is a skin pass composition additionally applied prior to the application of the composition for clear or translucent and colorless or nearly colorless emissive coating.

19. The process according to claim 12 characterized in that the clear or translucent emissive coating is modified in such way that it has a micro-roughened surface to gain a lotus effect by the topology of the microrough surface or that at least one hydrophobic substance is added to the composition to generate a lotus effect by the hydrophobic surface of the coating or by both.

20. An emissive coating prepared with the process according to claim 12.

21. The emissive coating according to claim 20 characterized in that it has a content of binder a) and pigment b) in a pigment-to-binder weight ratio in the range of from 0.1:1 to 0.6:1.

22. A cool element comprising a substrate having an upper surface as well as a clear or translucent emissive coating on at least a portion of the upper surface of the substrate characterized in that the emissive coating is prepared with the process according to claim 12, wherein the emissive coating has:
- a thermal emissivity TE in accordance with ASTM C-1371-04a of at least 0.40;
- a total solar reflectance TSR in accordance with ASTM C-1549-04 of at least 0.55; and
- a solar reflectance index SRI calculated in accordance with ASTM E 1980-01 of at least 40%.

* * * * *